(12) United States Patent
Ramsteiner

(10) Patent No.: US 11,573,323 B2
(45) Date of Patent: Feb. 7, 2023

(54) LIDAR ARRAY AS WELL AS A VEHICLE, AND ROBOT INCLUDING SUCH A LIDAR ARRAY

(71) Applicant: Robert Bosch GmbH, Stuttgart (DE)

(72) Inventor: Ingo Ramsteiner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 16/641,837

(22) PCT Filed: Aug. 27, 2018

(86) PCT No.: PCT/EP2018/073003
§ 371 (c)(1),
(2) Date: Feb. 25, 2020

(87) PCT Pub. No.: WO2019/042926
PCT Pub. Date: Mar. 7, 2019

(65) Prior Publication Data
US 2021/0165100 A1    Jun. 3, 2021

(30) Foreign Application Priority Data

Sep. 1, 2017 (DE) ...................... 10 2017 215 307.5

(51) Int. Cl.
*G01S 7/48* (2006.01)
*G01S 17/87* (2020.01)
(Continued)

(52) U.S. Cl.
CPC .............. *G01S 17/87* (2013.01); *G01S 7/484* (2013.01); *G01S 7/4817* (2013.01); *G01S 17/931* (2020.01); *G01S 17/48* (2013.01)

(58) Field of Classification Search
CPC .... G01S 7/4865; G01S 7/4817; G01S 7/4818; G01S 7/4816; G01S 17/08; G01S 7/4868;
(Continued)

(56) References Cited

U.S. PATENT DOCUMENTS 6,512,630 B1 * 1/2003 Zayhowski ........... H01S 3/0627
372/71
6,654,401 B2 * 11/2003 Cavalheiro Vieira .. H01S 3/107
372/71
(Continued)

FOREIGN PATENT DOCUMENTS

DE    102006007173 A1    8/2007
DE    102009028300 A1    2/2011
(Continued)

OTHER PUBLICATIONS

M. Tao et al., "Precision-Improved Pulsed Laser Ranging by Multidelayed Echo Signals Triggering," in IEEE Transactions on Instrumentation and Measurement, vol. 70, pp. 1-12, 2021, Art No. 2006612, doi: 10.1109/TIM.2021.3117632. (Year: 2021).*
(Continued)

*Primary Examiner* — Cuong H Nguyen
(74) *Attorney, Agent, or Firm* — Norton Rose Fulbright US LLP; Gerard Messina

(57) ABSTRACT

A LIDAR array is provided which includes a plurality of LIDAR systems. The first LIDAR system is spatially spaced apart from the second LIDAR system. A first laser beam of the first LIDAR system and a second laser beam are synchronized with one another in such a way that the first laser beam and the second laser beam mutually amplify one another in the shared far range.

14 Claims, 5 Drawing Sheets

(51) Int. Cl.
  *G01S 17/931* (2020.01)
  *G01S 7/481* (2006.01)
  *G01S 7/484* (2006.01)
  *G01S 17/48* (2006.01)

(58) Field of Classification Search
  CPC .......... G01S 17/48; G01S 17/87; H01S 3/107; H01S 3/1075; H01S 3/2308
  USPC ........... 372/12; 356/4, 5, 10, 148, 491, 4.01, 356/4.09
  See application file for complete search history.

(56) References Cited

U.S. PATENT DOCUMENTS

| | | | | |
|---|---|---|---|---|
| 6,917,635 | B2* | 7/2005 | Pruszenski, Jr. | H01S 5/0687 |
| | | | | 372/20 |
| 7,362,420 | B2* | 4/2008 | Zaugg | G01S 17/08 |
| | | | | 356/5.01 |
| 7,505,488 | B2* | 3/2009 | Halmos | G01S 7/484 |
| | | | | 372/18 |
| 8,073,344 | B2* | 12/2011 | Pruszenski | H04B 10/572 |
| | | | | 398/203 |
| 8,401,350 | B2* | 3/2013 | Okayama | G02B 6/4215 |
| | | | | 385/32 |
| 9,031,409 | B2* | 5/2015 | Nandiraju | H04L 12/2801 |
| | | | | 398/68 |
| 10,168,429 | B2* | 1/2019 | Maleki | H01S 5/021 |
| 10,197,818 | B2* | 2/2019 | Kwack | G02F 1/0147 |
| 11,255,970 | B2* | 2/2022 | Maleki | G01S 17/34 |
| 11,442,149 | B2* | 9/2022 | Maleki | G01S 7/4911 |
| 2002/0018494 | A1* | 2/2002 | Vieira | H01S 3/107 |
| | | | | 372/9 |
| 2007/0219720 | A1 | 9/2007 | Trepagnier et al. | |
| 2016/0084651 | A1* | 3/2016 | Hinderling | G01S 17/10 |
| | | | | 356/4.01 |
| 2016/0377721 | A1* | 12/2016 | Lardin | G01S 17/58 |
| | | | | 356/5.09 |
| 2017/0155225 | A1* | 6/2017 | Villeneuve | H01S 3/06758 |

FOREIGN PATENT DOCUMENTS

| | | |
|---|---|---|
| DE | 202010012985 U1 | 2/2012 |
| DE | 102011103349 A1 | 11/2012 |
| DE | 102015000426 A1 | 7/2016 |

OTHER PUBLICATIONS

C. Bamji et al., The Abstract of "A Review of Indirect Time-of-Flight Technologies," in IEEE Transactions on Electron Devices, vol. 69, No. 6, pp. 2779-2793, Jun. 2022, doi: 10.1109/TED.2022.3145762. (Year: 2022).*

M. Z. Chowdhury, M. T. Hossan, A. Islam and Y. M. Jang, "A Comparative Survey of Optical Wireless Technologies: Architectures and Applications," in IEEE Access, vol. 6, pp. 9819-9840, 2018, doi: 10.1109/ACCESS.2018.2792419. (Year: 2018).*

I. Haydaroglu and S. Mutlu, "Optical Power Delivery and Data Transmission in a Wireless and Batteryless Microsystem Using a Single Light Emitting Diode," in Journal of Microelectromechanical Systems, vol. 24, No. 1, pp. 155-165, Feb. 2015, doi: 10.1109/JMEMS.2014.2323202. (Year: 2015).*

International Search Report dated Nov. 29, 2018 for corresponding International Application PCT/EP2018/073003 filed Aug. 27, 2018.

* cited by examiner

LIDAR ARRAY AS WELL AS A VEHICLE, AND ROBOT INCLUDING SUCH A LIDAR ARRAY

FIELD

The present invention relates to a LIDAR array, to a vehicle, and to a robot including such a LIDAR array.

BACKGROUND INFORMATION

Scanning LIDAR (light detection and ranging) systems traverse a certain scan area or spatial area with a pulsed laser beam and ascertain the presence of and distance from objects on which the laser beam strikes. A LIDAR system typically has a laser source for generating a laser beam, a scanning device for scanning the emitted laser beam across a certain scan area, and a detector unit for detecting back-scattered light. Different alternative options exist for the scanning device. For example, the detector unit and the laser may be jointly pivoted by the scanning device, only the laser is pivoted, or a beam-deflecting element, such as a micro-mirror or a polygon, scans the laser beam.

When the laser beam strikes on an object, reflected light or back-scattered light is distributed or reflected across a wide spatial area, as a function of the reflection behavior, preferably in a particular spatial direction, which then usually does not point in the direction of the detector unit. In any event, apart from special cases, only a very small fraction of the back-scattered light scattered back by the object strikes on the detector unit, which accordingly limits the detection range. Increasing the laser power is only possible up to a certain limiting value due to eye safety.

SUMMARY

According to the present invention, an example LIDAR array is provided which includes a plurality of LIDAR systems. The example LIDAR array includes a first LIDAR system, which furthermore includes a first laser source, which generates a first laser beam, and a first scanning device, which scans the first laser beam across a first scan area. The LIDAR array furthermore includes a second LIDAR system, which includes a second laser source which generates a second laser beam. The second LIDAR system furthermore includes a second scanning device which scans the second laser beam across a second scan area. The first LIDAR system is spatially spaced apart from the second LIDAR system. Furthermore, the second scan area overlaps with the first scan area in a shared scan area, the shared scan area including a shared far range, which is spatially separated from a close range surrounding the LIDAR systems. The first laser beam and the second laser beam are synchronized with one another in such a way that the first laser beam and the second laser beam mutually amplify one another in the shared far range.

A far range is an area situated outside a close range. The close range is an area situated close to the LIDAR systems. For example, a close range may be defined in that the range of an individual LIDAR system suffices to detect an object within the close range. Outside such a close range, i.e., in the far range, an individual LIDAR system is accordingly not able to detect any objects due to a lack of range. This may be specified in more detail. When an individual LIDAR system has a range R, N such LIDAR systems may reach ranges of up to $(N)^{1/2}R$ when overlapping according to the present invention. The background is that the received intensity drops with $1/r^2$, r being the distance.

The LIDAR array according to the present invention has the advantage that the range of the LIDAR array is increased compared to conventional individual LIDAR systems, since the intensities double in the far range due to the synchronization of the laser beams, and thus also double the intensity of strikes on objects in the far range. In this way, back-scattered light having a higher intensity is also generated, so that it may also be detected. Furthermore, it is an advantage that, in the close range, a maximum of one beam may strike an eye, and thus the safety for eyes is ensured. In the far range, both beams are already widened and accordingly attenuated, so that these combined laser beams no longer pose any danger in the shared far range. In this way, eye safety is ensured. In the case of directed reflected surfaces, such as glass, the chance that back-scattered light strikes the detector unit at all increases. Moreover, a need-based scanning field may be generated. In applications in the vehicle field, for example in the case of long-distance trips, an increased requirement with regard to a range in the forward direction may exist. Depending on the position of the shared far range, an anisotropic or directionally dependent range distribution may thus be enabled.

The first laser beam and the second laser beam together preferably amplify one another exclusively in the shared far range. In this way, it is ensured that no hazard occurs in the close range.

The first laser beam and the second laser beam may be synchronized with one another in the process with respect to their scanning paths and their pulse sequences. Scanning path refers to the path of the laser beam across the respective scan area. As a result of the synchronization with respect to this variable, it may be ensured that the two laser beams in fact overlap in a desired shared far range. Light pulse sequence refers to the chronological succession of the individual light pulses. Furthermore, it may be ensured that the individual light pulses also amplify one another in the desired shared far range.

The first scan area and the second scan area may preferably cover an equally large scan area, the scanning devices scanning the first laser beam and the second laser beam at the same angular velocity and at a fixed phase offset across their respective scan areas. This allows a particularly simple, systematic implementation of the present invention.

The first laser source preferably emits a first light pulse, and the second laser source emits a second light pulse, the emission of the respective light pulses of both laser sources having a temporal shift, the temporal shift being dependent on an observation angle and being dependent on a distance between the laser sources. Depending on the observation angle and the distance of the LIDAR systems from one another, the optical path of the respective light pulse at a particular point may differ in the shared far range. As a result of a time delay, which depends on the distance and the observation angle, this different optical path at a particular point in the shared far range may advantageously be compensated for. This also encompasses that the time delay is zero when the respective optical paths are identical.

The first light source or the second light source may preferably linearly vary a light pulse frequency of the first laser beam or of the second laser beam. At a constant angular velocity and a small overlapping scan area, this is a particularly suitable implementation for compensating for different optical path lengths.

The first scan area and/or the second scan area may cover an angular range of 120°. For example, in this way a half space of 180° may be covered when the scan areas are offset from one another by 60°. This corresponds to a typical situation for vehicles and robots.

According to one example embodiment of the present invention, the first laser source may emit a first double light pulse with a first time difference, and the second laser source may emit a second double light pulse with a second time difference, the first time difference differing from the second time difference, and a light pulse of the first double light pulse being synchronized with a light pulse of the second double light pulse. In this way, back-scattered light, in particular, from an overlapping close range, may be unambiguously assigned to a particular LIDAR system. The differing time difference of the respective light pulses accordingly corresponds to a signature. The synchronization of one of the light pulses, in turn, ensures that two light pulses, one from each double light pulse, amplify one another in the shared far range.

According to one specific example embodiment of the present invention, it is provided that the LIDAR array includes a third LIDAR system. The third LIDAR system includes a third laser source, which generates a third laser beam. The third LIDAR system furthermore includes a third scanning device, which scans the third laser beam across a third scan area. The third LIDAR system is spatially spaced apart from the first LIDAR system and the second LIDAR system. Furthermore, the third scan area overlaps with the first scan area and the second scan area in a shared scan area, the shared scan area including a shared far range, which is spatially separated from a close range surrounding the LIDAR systems. The first laser beam, the second laser beam and the third laser beam are synchronized with one another in such a way that the first laser beam, the second laser beam and the third laser beam amplify one another in the shared far range. By adding the third LIDAR system, the shared far range may have an even larger range compared to embodiments including two LIDAR systems.

The first scan area and the third scan area may overlap in a shared first scan area, the shared first scan area including a shared first far range, which is spatially separated from the shared far range and the close range surrounding the LIDAR systems, and the second scan area and the third scan area overlapping in a shared second scan area, the shared second scan area including a shared second far range, which is spatially separated from the shared far range, the shared first far range and the close range surrounding the LIDAR systems. In this way, a first far range and a second far range are provided, having an average range, i.e., in particular, a lower range than the shared far range, however a greater range than a close range. In this way, a need-based range profile is advantageously created.

Furthermore, an example vehicle including a LIDAR array described according to the above example embodiments is provided. The vehicle is, in particular, an autonomous vehicle, in which such a LIDAR array may be particularly advantageous.

Furthermore, an example robot including a LIDAR array according to one of the above example embodiments is provided. For example, the robot may be an autonomous agricultural robot, an autonomous lawn mower or an autonomous vacuum cleaner, the present invention not being limited to these examples.

Advantageous refinements of the present invention are described herein.

BRIEF DESCRIPTION OF THE DRAWINGS

Exemplary embodiments of the present invention are described in greater detail below based on the figures.

DETAILED DESCRIPTION OF EXAMPLE EMBODIMENTS

Figure 1:
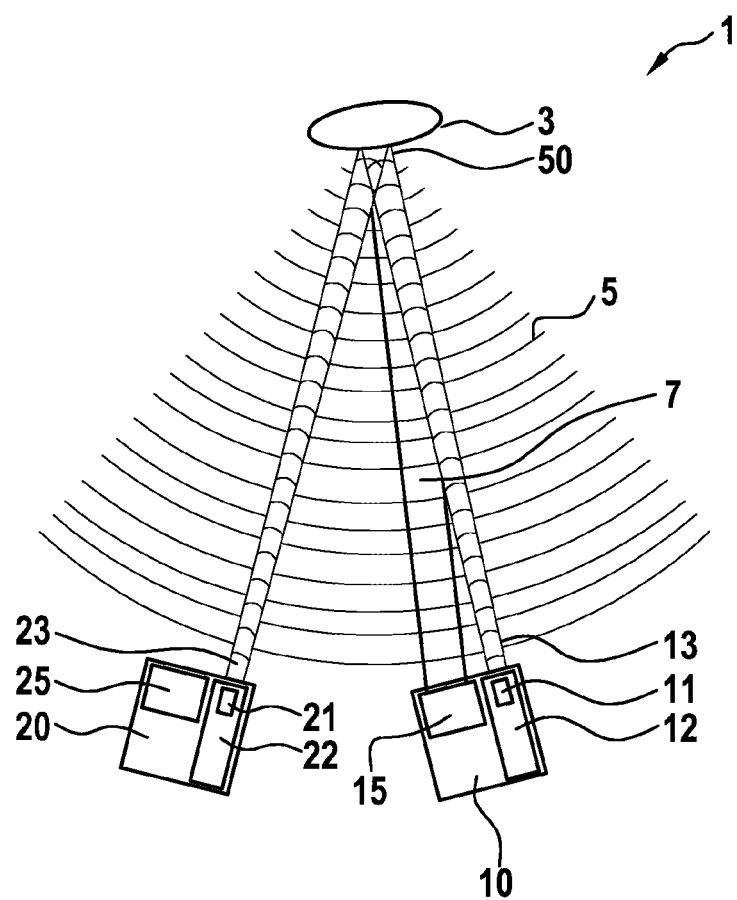
FIG. 1 shows a LIDAR array according to the present invention including two LIDAR systems.

FIG. 1 shows an example LIDAR array 1 according to the present invention. The LIDAR array includes a first LIDAR system 10. First LIDAR system 10 furthermore includes a first laser source 11, which generates a first laser beam 13. First LIDAR system 10 furthermore includes a first scanning device 12 which scans first laser beam 13 across a first scan area 14. One example of a first scan area 14 may, in particular, be comprehensible in connection with FIGS. 2 and 3.

LIDAR array 1 furthermore includes a second LIDAR system 20. Second LIDAR system 20 also includes a second laser source 21, which generates a second laser beam 23. Second LIDAR system 20 furthermore includes a second scanning device 22 which scans second laser beam 23 across a second scan area 24.

Figure 2:
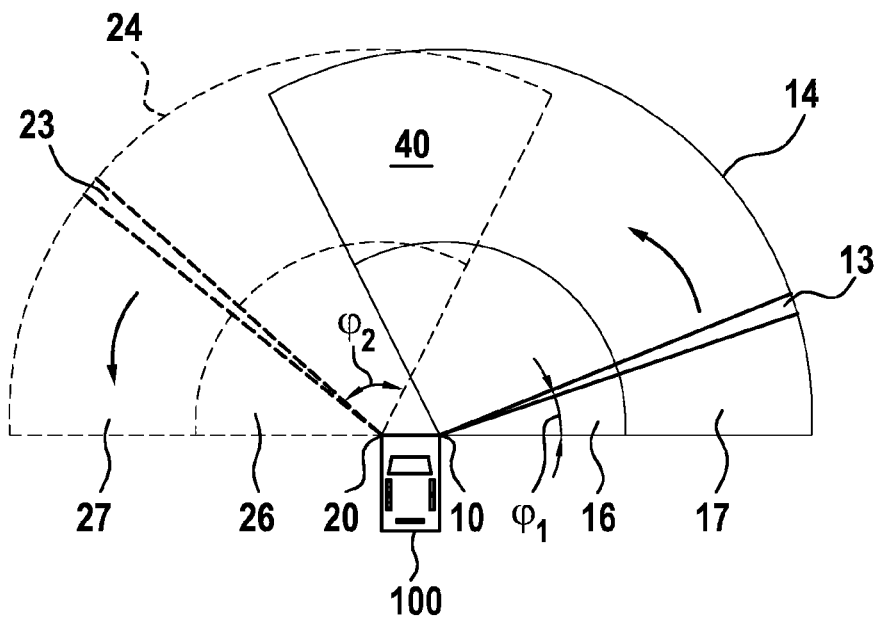
FIG. 2 and FIG. 3 show a LIDAR array according to the present invention to illustrate the synchronization of the scanning paths.
Figure 3:
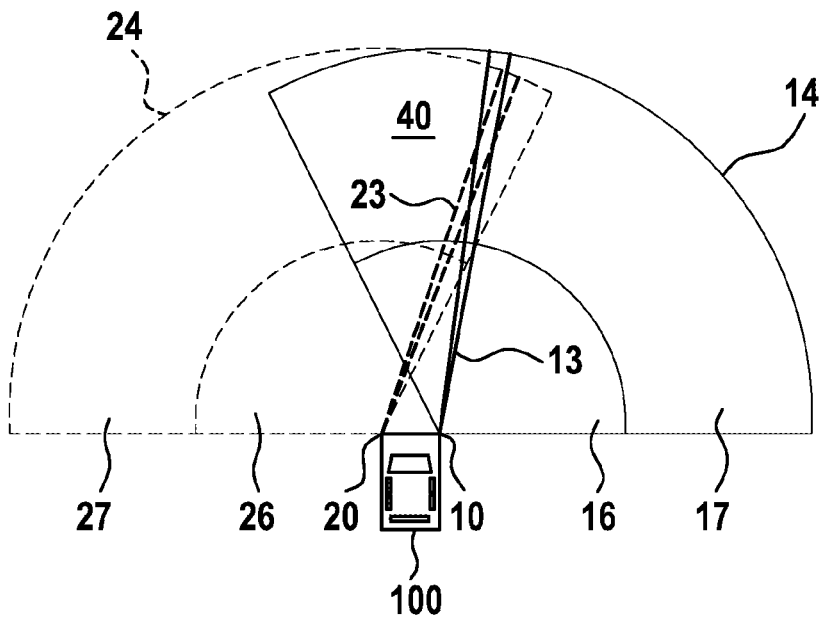

Again, second scan area 24 may be derived in an exemplary embodiment from FIGS. 2 and 3. First LIDAR system 10 is furthermore spatially spaced apart from second LIDAR system 20. In other words, first LIDAR system 10 has a spatial distance from second LIDAR system 20. Furthermore, second scan area 24 overlaps with first scan area 14 in a shared scan area. In particular, this shared scan area encompasses a shared far range 50, which is spatially separated from close ranges surrounding LIDAR systems 10, 20. In the present FIG. 1, this becomes apparent in that first laser beam 13 overlaps with second laser beam 23 in shared far range 50. First laser beam 13 and the second laser beam 23 are furthermore synchronized with one another in such a way that first laser beam 13 and second laser beam 23 mutually amplify one another in shared far range 50. In particular, this means that the intensity of the laser beams increases in shared far range 50.

Purely by way of example, an object 3 is positioned in shared far range 50. Shared far range 50 is a range which is situated outside, i.e., further away from, LIDAR systems 10, 20 than a close range 51, 52, 53; see, in particular, FIG. 4 in this regard. The close range is an area situated close to LIDAR systems 10, 20. For example, a close range may be defined in that the range of an individual LIDAR system 10, 20 suffices to detect an object 3 within the close range. Outside such a close range, i.e., in a far range, an individual LIDAR system 10, 20 is accordingly not able to detect any objects 3 due to a lack of range. In the present invention, it is advantageously made possible by the synchronization of laser beams 13, 23 in the shared far range 50 to also detect objects 3 in this far range.

A back-scattered light 5 due to reflection on this object 3 may then have a sufficiently high intensity. A detection light 7 may then be detected by a first detector unit 15. First detector unit 15 is integrated into first LIDAR system 10 by way of example, the present invention not being limited thereto. For example, a second detector unit 25, which is encompassed by second LIDAR system 20, may also be used to detect the light scattered back from shared far range 50 on object 3.

LIDAR array 1 according to the present invention has the advantage that the range of LIDAR array 1 is increased compared to individual LIDAR systems of the related art, since the intensities of the laser beams amplify in shared far range 50, and thus also back-scattered light having a higher intensity is generated from shared far range 50, and may thus be detected. Furthermore, it is an advantage that a maximum of one laser beam may strike an eye in the close range, and thus the safety for eyes is ensured, which is achieved by the spatial distance of LIDAR systems 10, 20 from one another and the synchronization in shared far range 50. In shared far range 50, both beams are already widened and accordingly attenuated, so that these combined laser beams no longer pose any danger in shared far range 50. In this way, eye safety is ensured. In the case of directed reflected surfaces, such as glass, the chance that back-scattered light strikes a detector unit at all increases. Moreover, a need-based scanning field may be generated. In applications in the vehicle field, for example in the case of long-distance trips, an increased requirement with regard to a range in the forward direction may exist. Depending on the position of shared far range 50, an anisotropic or directionally dependent range distribution may thus be enabled.

FIG. 2 and FIG. 3 show an example LIDAR array 1 according to the present invention to illustrate the synchronization of the scanning paths. The synchronization of first laser beam 13 with second laser beam 23 may take place with respect to their scanning paths and their light pulse sequences. These two figures show the synchronization of the scanning paths by way of example.

Purely by way of example, again two LIDAR systems 10, 20 are used, the present invention not being limited thereto. Both LIDAR systems 10, 20 are attached at or in a vehicle 100 purely by way of example. Purely by way of example, first LIDAR system 10 is situated at a first front corner at the front side of vehicle 100. Second LIDAR system 20 is situated at a second front corner at the front side of vehicle 100. The spatial distance between the two LIDAR systems 10, 20 approximately corresponds to the width of vehicle 100 in this example.

A first laser beam 13 generated by first LIDAR system 10 is scanned across a first scan area 14 with the aid of a first scanning device 12. A second laser beam 23 generated by second LIDAR system 20 is scanned across a second scan area 24 with the aid of a second scanning device 22, which is not shown explicitly here. First scan area 14 and the second scan area 24 preferably cover an equally large scan area. In the present example, a scan area of 120° is selected, the present invention not being limited thereto.

First scan area 14 represents a sector of a circle which, proceeding from an extension of the connecting line of the two LIDAR systems 10, 20, extends in a positive rotating direction up to 120°. Purely by way of example, second scan area 24 is rotated 60° in the positive rotating direction compared to first scan area 14. In this exemplary embodiment, this yields a shared scan area 40 of 60°, in which the two scan areas 14, 24 intersect. It is situated in an orthogonal direction with respect to the connecting line of the two LIDAR systems 10, 20. The instantaneous rotation angle of first laser beam 13 is denoted by $\varphi_1$, and the instantaneous rotation angle of second laser beam 23 is denoted by $\varphi_2$. Rotation angles $\varphi_1$, $\varphi_2$ are dimensioned with respect to their respective scan areas 14, 24.

Both laser beams 13, 23 may preferably be synchronously guided across their respective scan areas 14, 24 at a constant angular velocity and at a fixed phase offset. In the present example, this means that the following always applies: $\varphi_1 = (\varphi_2 + 60° - \delta) \mod (120°)$. In other words, $\varphi_1$ always trails rotation angle $\varphi_2$ by $60° - \delta$. Here, $\delta$ corresponds to a small angle, which ensures that the two laser beams 13, 23 overlap one another. This results from the desired intersection distance and the distance of the two LIDAR systems 10, 20 with the aid of a geometric consideration.

In both FIGS. 2 and 3, furthermore first scan area 14 is divided into a first near field 16 and a first far field 17 for first laser beam 13. Furthermore, second scan area 24 is divided into a second near field 26 and a second far field 27 for second laser beam 23. In near field 16, 26, each LIDAR system 10, 20 is able to detect objects on its own. Far fields 17, 27 are situated outside the range. FIG. 3 furthermore shows an overlap of first laser beam 13 with second laser beam 23 in a shared scan area 40, which is situated outside near fields 16, 26. In contrast, FIG. 2 shows a situation in which the two laser beams 13, 23 are instantaneously oriented in their respective scan area 14, 24.

Figure 4:
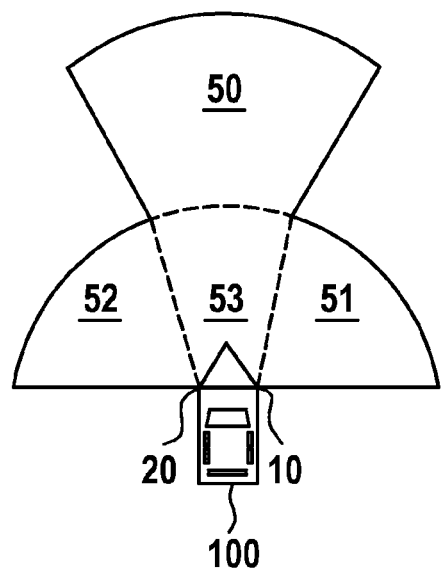
FIG. 4 shows a LIDAR array according to the present invention with a range division in the case of two LIDAR systems.

FIG. 4 shows an example LIDAR array 1 according to the present invention including a range division. First close range 51 is only traversed by first laser beam 13. Second close range 52 is only traversed by second laser beam 23. Shared closed range 53 is traversed both by first laser beam 13 and by second laser beam 23, no amplification taking place in this range. Shared far range 50, in which laser beams 13, 23 amplify one another, is accordingly traversed both by first laser beam 13 and by second laser beam 23. In the present specific embodiment, a maximum range is thus present in the central driving direction of vehicle 100, whereas lower ranges are present in the lateral directions.

Figure 5:
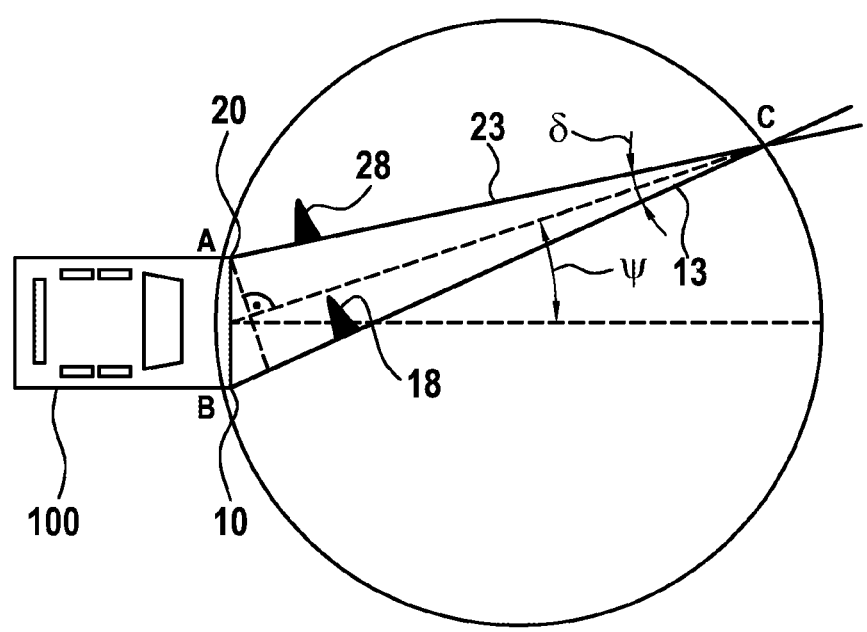
FIG. 5 shows a LIDAR array according to the present invention to illustrate the synchronization of the light pulses.

FIG. 5 shows an example LIDAR 1 array according to the present invention to illustrate an exemplary synchronization of the light pulses.

First LIDAR system 10 is positioned at an exemplary position A and emits a first laser beam 13. First light pulse 18 to be synchronized by way of example is outlined. Second LIDAR system 20 is positioned at an exemplary position B and emits a second laser beam 23. Second light pulse 28 to be synchronized by way of example is also outlined. The distance of the two LIDAR systems 10, 20 is predefined by way of example by distance AB.

The synchronization point is denoted by C here. It corresponds to a point in shared far range 50. Positions A, B and C form a triangle. Angle $\delta$ at C is given by the above-mentioned phase offset of the scan angles. Since $\delta$ and distance AB are constant, a fixed radius of triangle ABC follows for all C from the sine rule. Synchronization point C is situated in the direction of an angle bisecting line at observation angle $\psi$ to an orthogonal with respect to connecting line AB. If $\psi=0$, the optical path is identical for both laser beams 21. A simultaneously emitted first light pulse 18 and a second light pulse 28 then accordingly arrive simultaneously at synchronization point C, and also simultaneously reach detector units 15, 25 of LIDAR systems 10, 20. For $\psi \neq 0$, however, a differently long optical path results up to synchronization point C, i.e., a runtime difference exists. Its contribution and its mathematical calculation as a function of ψ depends on the specific arrangement and distance AB of the two LIDAR systems 10, 20 and may be determined with the aid of geometry. For small ψ and object distances>>AB, it linearly depends in good approximation on ψ.

For both light pulses 18, 28 to arrive simultaneously at synchronization point C, a time delay may accordingly be set, in the present case for second LIDAR system 20, which has the shorter optical path, as a function of observation angle ψ. In this way, the different runtimes or different optical paths may be compensated for. At constant angular velocities of laser beams 13, 23 and a small overlapping area, this may be implemented, for example, in that at least one of the two LIDAR systems 10, 20 linearly varies its light pulse frequency, in particular, synchronously with scan angles φ(t) which are also linear over time.

The synchronization of light pulses 18, 28 described in the present figure may be used for individual pulses, which then amplify accordingly in shared far range 50. In the overlapping shared close range 53, however, this may result in problems, since the distinction between the host light and that of the other LIDAR system may be important during the detection. In this case, it is advantageous when detector units 15, 25 only have fields of sight along their laser beams 13, 23 and are trailed during scanning. In the case of multiple, easily reflecting objects in the close range, however, this may result in ambiguities.

Figure 6:
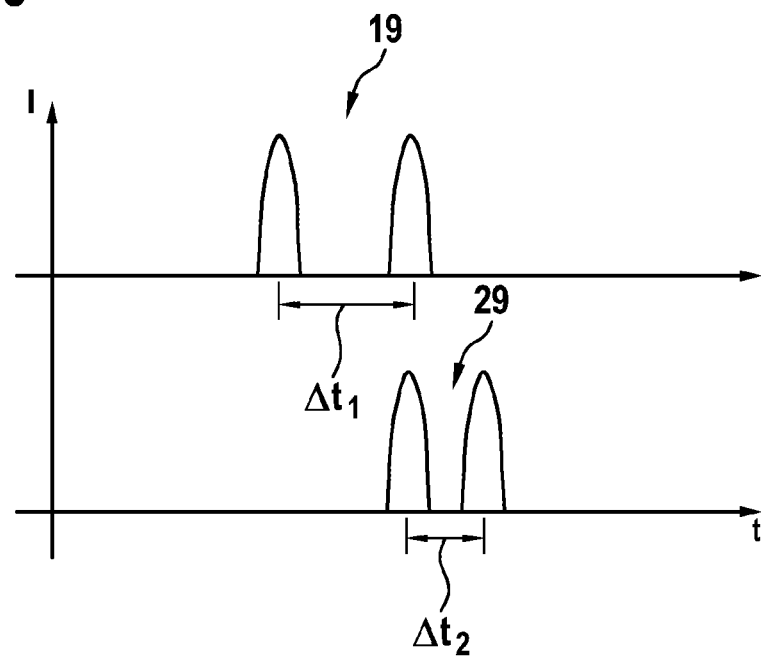
FIG. 6 shows a representation of the emission of double light pulses.

FIG. 6 shows a representation of the emission of double light pulses 19, 29. By way of example, first laser source 11 emits a first double light pulse 19 with a first time difference Δt1 between the individual light pulses. By way of example, second laser source 21 emits a second double light pulse 29 with a second time difference Δt2. First time difference Δt1 and second time difference Δt2 differ from one another. In the present example, second time difference Δt2 is smaller than first time difference Δt1, for example, the present invention not being limited thereto.

The two double light pulses 19, 29 are synchronized with one another, by way of example, in such a way that two light pulses, one from each double light pulse 19, 29, arrive simultaneously at a desired intersecting point of laser beams 13, 23 in shared far range 50 and accordingly may amplify one another. In the present example, the second light pulse of first double light pulse 19 is synchronized with the first light pulse of second double light pulse 29.

In the case of reflections in the close range, i.e., when an object 3 is situated in the close range, a detector unit 15, 25 is able to distinguish the two double light pulses 19, 29 from one another upon detection due to the different time differences, as a result of the different time signature of the double light pulses.

In this way, each double light pulse 19, 29 may be assigned to the corresponding generating LIDAR system 20, 30, so that ambiguities during the detection may advantageously be avoided.

The length of an individual light pulse may preferably be in the range of individual nanoseconds. The time difference between the light pulses may be less than 1 μs. The distance between two double light pulses may be within the distance of individual μs (unambiguousness across maximum runtime). The present invention, however, is not limited to these numerical values.

Figure 7:
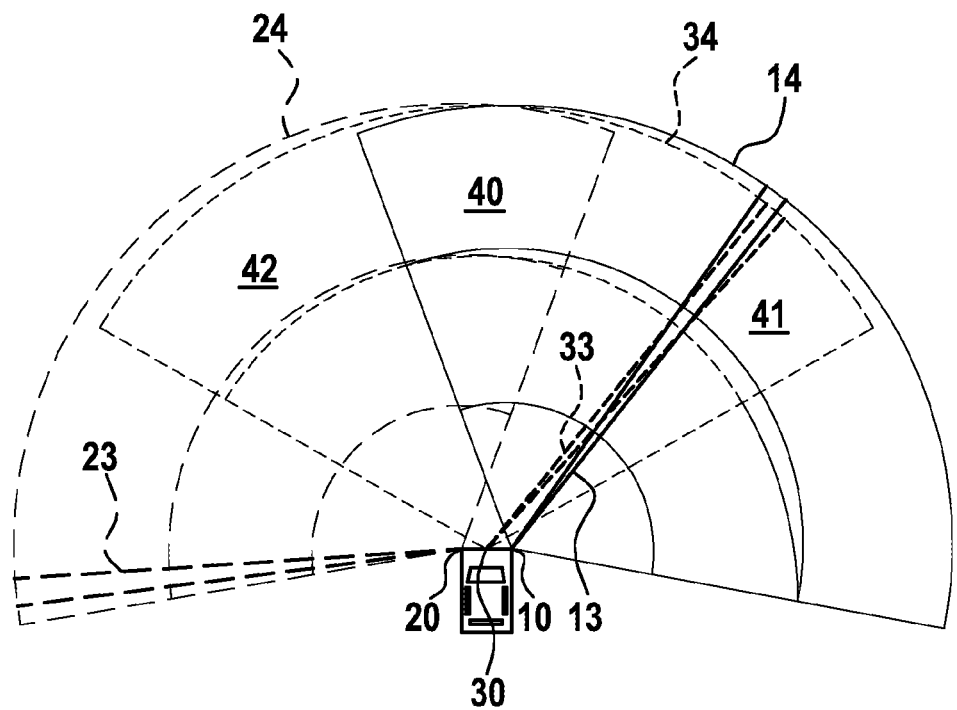
FIG. 7 shows a LIDAR array according to the present invention including three LIDAR systems.

Similarly to FIG. 3, FIG. 7 shows a LIDAR array 1. In this embodiment variant, however, LIDAR array 1 includes three LIDAR systems 10, 20, 30, a first LIDAR system 10, a second LIDAR system 20 and a third LIDAR system 30. Compared to FIG. 3, third LIDAR system 30 is positioned, purely by way of example, between first LIDAR system 10 and second LIDAR system 20, the present invention not being limited thereto.

By way of example, third LIDAR system 30 is positioned on a vehicle 100. Third LIDAR system 30 includes a third laser source, which generates a third laser beam 33. Third LIDAR system 30 furthermore includes a third scanning device which scans third laser beam 33 across a third scan area 34. In particular, third scan area 34 overlaps with first scan area 14 of first LIDAR system 10 and second scan area 24 of second LIDAR system 20.

The overlap of the three scan areas 14, 24, 34 results in a shared scan area 40. By way of example, the overlap of first scan area 14 with third scan area 34 results in a shared first scan area 41. By way of example, the overlap of second scan area 24 with third scan area 34 results in a shared second scan area 42.

In the present embodiment, all scan areas 14, 24, 34 have an exemplary angular range of 120°. Shared scan area 40 thus has an opening angle of 40°. In the present instantaneous beam position, first laser beam 13 overlaps with third laser beam 33 in the area of the shared first scan area 41.

Figure 8:
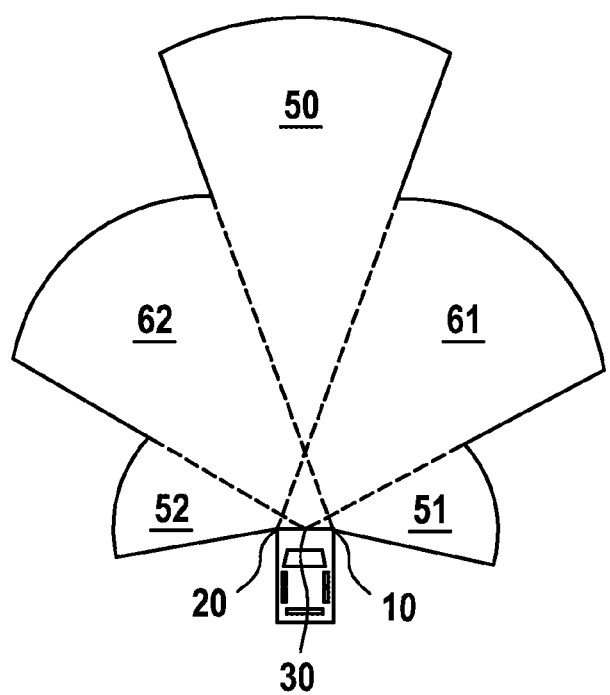
FIG. 8 shows a LIDAR array according to the present invention with a range division in the case of three LIDAR systems.

FIG. 8 shows an example LIDAR array 1 according to the present invention including a range division in the case of three LIDAR systems 10, 20, 30. Shared far range 50 is the area with the greatest range in which all three laser beams 13, 23, 33 amplify one another. First laser beam 13 and third laser beam 33 amplify one another in a shared first far range 61, as is shown by way of example in FIG. 7. Second laser beam 23 and third laser beam 33 amplify one another in a shared second far range 62. The ranges of shared first far range 61 and of shared second far range 62 are identical to one another and smaller than shared far range 50, since only two light pulses amplify one another here.

A respective first close range 51 and a second close range 52 are plotted at the boundary, in which only first LIDAR system 10 and second LIDAR system 20 scan, respectively. This range is accordingly short.

Figure 9:
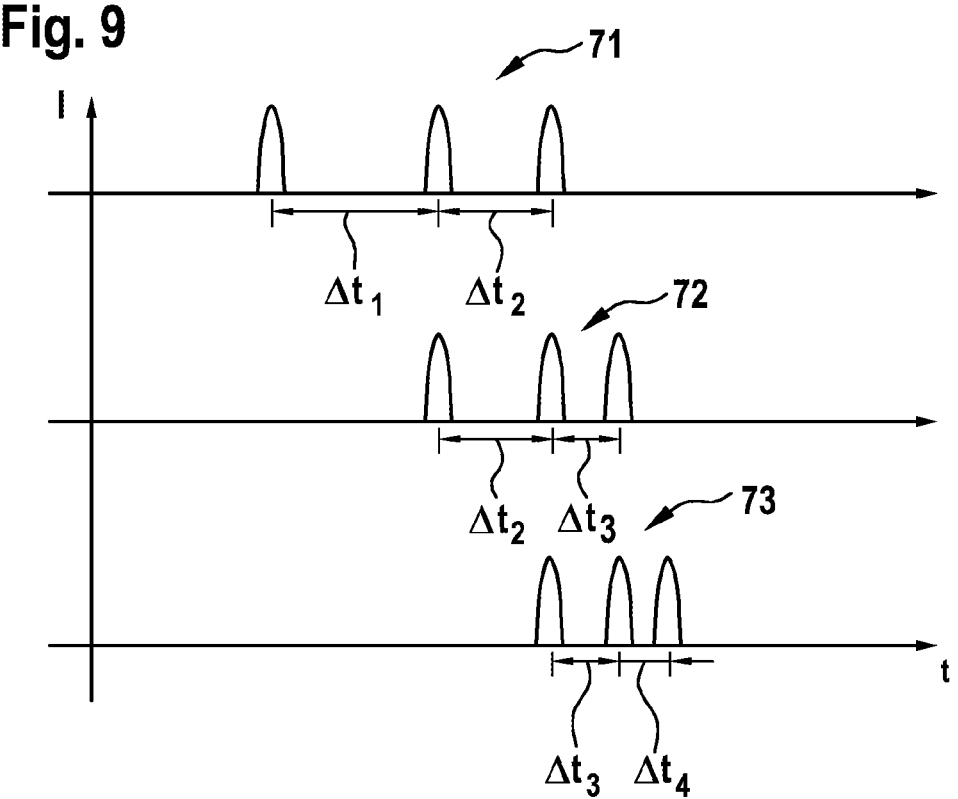
FIG. 9 shows a representation of the emission of triple light pulses.

FIG. 9 shows an exemplary light pulse sequence when using three LIDAR systems 10, 20, 30. By way of example, each of the three LIDAR systems 10, 20, 30 emits a triple light pulse 71, 72, 73 with the aid of the respective laser sources 11, 21. First laser source 11 emits a first triple light pulse 71. Second laser source 21 emits a second triple light pulse 72, and third laser source emits a third triple light pulse 73. The triple light pulses each have a different individual light pulse sequence.

By way of example, first triple light pulse 71 has a first time difference Δt1 between the first light pulse and the second light pulse, and a second time difference Δt2 between the second and third light pulses. By way of example, second triple light pulse 72 has a second time difference Δt2 between the first light pulse and the second light pulse, and a third time difference Δt3 between the second and third light pulses. By way of example, third triple light pulse 73 has a third time difference Δt3 between the first light pulse and the second light pulse, and a fourth time difference Δt4 between the second and third light pulses. The four time differences Δt1, Δt2, Δt3, Δt4 each differ from one another. In this embodiment, the second and third light pulses of first triple light pulse 71 are furthermore synchronized with the first and second light pulses of second triple light pulse 72. In this embodiment, the second and third light pulses of second triple light pulse 72 are furthermore synchronized with the first and second light pulses of third triple light pulse 72.

In this way, each LIDAR system 10, 20, 30 has its own triple light pulse signature to avoid ambiguities, and a characteristic shared double light pulse with the respective adjoining LIDAR system 10, 20, 30, or at least one individual light pulse with all three laser beams, which it may use as a function of the scan area.

The present invention is not limited to the use of two LIDAR systems 10, 20 or three LIDAR systems 10, 20, 30. Rather, N>3 LIDAR systems may also be used.

The present invention also encompasses LIDAR systems 10, 20, 30 which are situated in a different manner than in the arrangements implemented by way of example; see in this regard FIG. 3 or FIG. 8, for example. In other specific embodiments for the arrangement or positioning, different overlapping patterns may be developed, for example, which are also encompassed by the present invention. The selected specific embodiments, see FIG. 3 or 8, for example, advantageously strive for a central shared far range 50 having a maximum range and increasingly less far-reaching lateral fields.

This corresponds to typical requirements with regard to automotive LIDAR systems, namely an increased range in the driving direction. However, generally, other combinations are also encompassed by the present invention.

What is claimed is:

1. A LIDAR array comprising:
   a first LIDAR system including a first laser source with which a first laser beam can be generated and a first scanning device, wherein the first scanning device is configured to scan the first laser beam across a first scan area;
   a second LIDAR system including a second laser source with which a second laser beam can be generated and a second scanning device, wherein the second scanning device is configured to scan the second laser beam across a second scan area;
   wherein:
      the first LIDAR system is spatially spaced apart from the second LIDAR system;
      the second scan area overlaps with the first scan area in a shared scan area that includes a shared far range, which is spatially separated from a close range surrounding the LIDAR systems;
      the first laser beam and the second laser beam are synchronized with each other such that the first laser beam and the second laser beam mutually amplify each other in the shared far range; and
      the LIDAR array provides at least one of the following features (a)-(c):
         (a) the scanning of the first laser beam varies a scanning angle of the first laser beam over time, and a light pulse frequency of the first laser beam is varied linearly as a function of the scanning angle of the first laser beam and/or the scanning of the second laser beam varies a scanning angle of the second laser beam over time, and a light pulse frequency of the second laser beam is varied linearly as a function of the scanning angle of the second laser beam;
         (b) the first laser source is configured to emit a first double light pulse with a first time difference, and the second laser source is configured to emit a second double light pulse with a second time difference, the first time difference differing from the second time difference, a light pulse of the first double light pulse being synchronized with a light pulse of the second double light pulse; and
         (c) (i) the LIDAR array further comprises a third LIDAR system that includes a third laser source with which a third laser beam can be generated and a third scanning device, (ii) the third scanning device is configured to scan the third laser beam across a third scan area, (iii) the third LIDAR system is spatially spaced apart from the first LIDAR system and from the second LIDAR system, (iv) the third scan area overlaps with the first scan area and the second scan area in the shared scan area, (v) the first laser beam, the second laser beam, and the third laser beam are synchronized with one another such that the first laser beam, the second laser beam, and the third laser beam mutually amplify one another in the shared far range, (vi) the first scan area and the third scan area overlap in a first shared scan area, (vii) the first shared scan area includes a first shared far range, which is spatially separated from the shared far range and the close range surrounding the LIDAR systems, (viii) the second scan area and the third scan area overlap in a second shared scan area, and (ix) the second shared scan area includes a second shared far range, which is spatially separated from the shared far range, the first shared far range, and the close range surrounding the LIDAR systems.

2. The LIDAR array device as recited in claim 1, wherein the scanning of the first laser beam varies the scanning angle of the first laser beam over time, and the light pulse frequency of the first laser beam is varied linearly as the function of the scanning angle of the first laser beam and/or the scanning of the second laser beam varies the scanning angle of the second laser beam over time, and the light pulse frequency of the second laser beam is varied linearly as the function of the scanning angle of the second laser beam.

3. The LIDAR array as recited in claim 1, wherein the first laser source is configured to emit the first double light pulse with the first time difference, and the second laser source is configured to emit the second double light pulse with the second time difference, the first time difference differing from the second time difference, the light pulse of the first double light pulse being synchronized with the light pulse of the second double light pulse.

4. The LIDAR array as recited in claim 1, wherein:
   the LIDAR array further comprises the third LIDAR system that includes the third laser source with which the third laser beam can be generated and the third scanning device;
   the third scanning device is configured to scan the third laser beam across the third scan area;
   the third LIDAR system is spatially spaced apart from the first LIDAR system and from the second LIDAR system;
   the third scan area overlaps with the first scan area and the second scan area in the shared scan area;
   the first laser beam, the second laser beam, and the third laser beam are synchronized with one another such that the first laser beam, the second laser beam, and the third laser beam mutually amplify one another in the shared far range;
   the first scan area and the third scan area overlap in the shared first scan area;
   the first shared scan area includes the first shared far range, which is spatially separated from the shared far range and the close range surrounding the LIDAR systems;

the second scan area and the third scan area overlap in the second shared scan area; and the second shared scan area includes the second shared far range, which is spatially separated from the shared far range, the shared first far range, and the close range surrounding the LIDAR systems.

5. A LIDAR array device comprising:

a first LIDAR system including a first laser source from which a first laser beam can be emitted and a first scanning device with which a first scanning, by which the first laser beam can be angularly moved over time across a first scan area, can be performed; and a second LIDAR system including a second laser source from which a second laser beam can be emitted and a second scanning device with which a second scanning, by which the second laser beam can be angularly moved over time across a second scan area, can be performed;

wherein:
the first LIDAR system has a first detection range distance using the first laser beam;
the second LIDAR system has a second detection range distance using the second laser beam;
the first LIDAR system is spatially spaced apart from the second LIDAR system;
the second scan area overlaps with the first scan area in a shared scan area, that includes a shared far range, which is spatially separated from a close range surrounding the LIDAR systems; and
the LIDAR array device is configured to synchronize the first scanning of the first laser beam and the second scanning of the second laser beam to cause the emitted first laser beam and the emitted second laser beam to impinge upon each other in the shared far range to thereby form an amplified signal using which at least one of the first and second LIDAR systems has a third detection range distance that is a farther distance than each of the first and second distance ranges.

6. A vehicle including a LIDAR array device, the LIDAR array device comprising:

a first LIDAR system including a first laser source from which a first laser beam can be emitted and a first scanning device with which a first scanning, by which the first laser beam can be angularly moved over time across a first scan area, can be performed; and a second LIDAR system including a second laser source from which a second laser beam can be emitted and a second scanning device with which a second scanning, by which the second laser beam can be angularly moved over time across a second scan area, can be performed;

wherein:
the first LIDAR system has a first detection range distance using the first laser beam;
the second LIDAR system has a second detection range distance using the second laser beam;
the first LIDAR system is spatially spaced apart from the second LIDAR system;
the second scan area overlaps with the first scan area in a shared scan area that includes a shared far range, which is spatially separated from a close range surrounding the LIDAR systems; and
the LIDAR array device is configured to synchronize the first scanning of the first laser beam and the second scanning of the second laser beam to cause the emitted first laser beam and the emitted second laser beam to impinge upon each other in the shared far range to thereby form an amplified signal using which at least one of the first and second LIDAR systems has a third detection range distance that is a farther distance than each of the first and second distance ranges.

7. A robot including a LIDAR array device, the LIDAR array device comprising:

a first LIDAR system including a first laser source from which a first laser beam can be emitted and a first scanning device with which a first scanning, by which the first laser beam can be angularly moved over time across a first scan area, can be performed; and a second LIDAR system including a second laser source from which a second laser beam can be emitted and a second scanning device with which a second scanning, by which the second laser beam can be angularly moved over time across a second scan area, can be performed;

wherein:
the first LIDAR system has a first detection range distance using the first laser beam;
the second LIDAR system has a second detection range distance using the second laser beam;
the first LIDAR system is spatially spaced apart from the second LIDAR system;
the second scan area overlaps with the first scan area in a shared scan area that includes a shared far range, which is spatially separated from a close range surrounding the LIDAR systems; and
the LIDAR array device is configured to synchronize the first scanning of the first laser beam and the second scanning of the second laser beam to cause the emitted first laser beam and the emitted second laser beam to impinge upon each other in the shared far range to thereby form an amplified signal using which at least one of the first and second LIDAR systems has a third detection range distance that is a farther distance than each of the first and second distance ranges.

8. The LIDAR array device as recited in claim 5, wherein the synchronization is performed by controlling a synchronization of respective scanning paths of the first and second laser beams relative to each other and of respective light pulse sequences of the first and second laser beams relative to each other.

9. The LIDAR array device as recited in claim 5, wherein the first scan area and the second scan area cover an equally sized scan area, the first and second scanning devices scanning the first laser beam and the second laser beam at thea same angular velocity and at a fixed phase offset across their respective scan area.

10. The LIDAR array device as recited in claim 5, wherein the first scan area and/or the second scan area cover a respective angular range of 120°.

11. The LIDAR array device as recited in claim 5, wherein the first laser source emits a first light pulse and the second laser source emits a second light pulse, the emission of the respective first and second light pulses of both the first and second laser sources has a temporal shift, the temporal shift being dependent on an observation angle and being dependent on a distance between the first and second laser sources.

12. The LIDAR array device as recited in claim 5, further comprising:

a third LIDAR system including a third laser source from which a third laser beam can be emitted and a third scanning device with which a third scanning, by which the third laser beam can be angularly moved over time across a third scan area, can be performed;

wherein:

the third LIDAR system is spatially spaced apart from the first LIDAR system and from the second LIDAR system;

the third scan area overlaps with the first scan area and the second scan area in the shared scan area; and the LIDAR array device is configured to synchronize the first scanning of the first laser beam, the second scanning of the second laser beam, and the third scanning of the third laser beam to cause the emitted first laser beam, the emitted second laser beam, and the emitted third laser beam to impinge upon one another for formation of a further amplified signal using which at least one of the first, second, and third LIDAR systems has a fourth detection range distance that is a farther distance than the third distance range distance.

13. The LIDAR array device as recited in claim 5, wherein the synchronization includes setting a first inter-pulse period for the first laser beam that defines an amount of time between temporally adjacent pulses of the first laser beam and a second inter-pulse pulse period for the second laser beam that defines an amount of time between temporally adjacent pulses of the second laser beam, the first inter-pulse period being different than the second inter-pulse period.

14. The LIDAR array device as recited in claim 5, wherein the first laser beam and the second laser beam are able to amplify each other exclusively in the shared far range.

* * * * *